Figure 1:
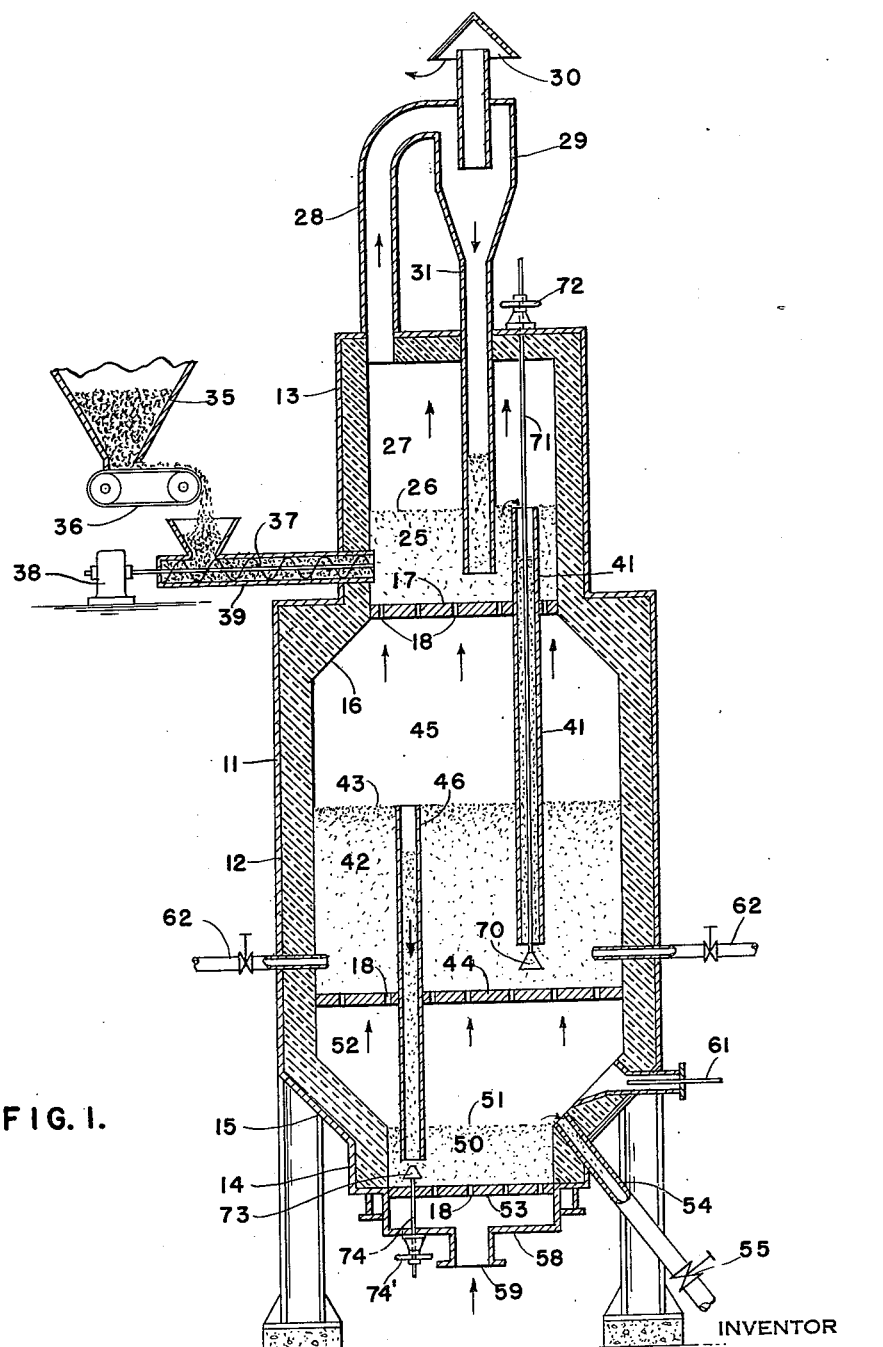

Feb. 5, 1952  F. S. WHITE  2,584,312
REACTOR FURNACE

Filed April 8, 1947  3 Sheets-Sheet 1

INVENTOR
FRANK S. WHITE,
BY
Arthur Middleton
ATTORNEY

Feb. 5, 1952     F. S. WHITE     2,584,312
REACTOR FURNACE

Filed April 8, 1947     3 Sheets-Sheet 2

INVENTOR
FRANK S. WHITE,
BY
ATTORNEY

Feb. 5, 1952          F. S. WHITE          2,584,312

REACTOR FURNACE

Filed April 8, 1947          3 Sheets-Sheet 3

INVENTOR
FRANK S. WHITE,
BY Autumn Middleton
ATTORNEY

Patented Feb. 5, 1952

2,584,312

UNITED STATES PATENT OFFICE 2,584,312

REACTOR FURNACE

Frank S. White, Westport, Conn.

Application April 8, 1947, Serial No. 740,151

2 Claims. (Cl. 263—21)

This invention relates to the contacting of solids and gases under conditions whereby there is desired to effect some action therebetween, either physical or chemical or both and especially heat treatment is involved. More particularly the invention relates to a reactor having an enclosed casing in which is maintained an ever-changing constantly renewed body of gas and a gas permeable apertured substantially horizontal partition dividing the casing into an upper and a lower compartment. On this partition is supported a bed or layer of solids to be treated with a free-board space thereabove while gas to treat the solids is passed through the apertured partition under such conditions that the solids of the bed are suspended in the upflowing gas, that is, mobilized or fluidized so that the bed simulates a boiling liquid. A reactor of this type is arranged so that the fluid level of the bed is determined by the top of a spill-conduit adapted to conduct treated solids downwardly away from the fluid level of the bed, while the solids fed for treatment in the bed are supplied thereto beneath its fluid level whereby solids being treated while in suspension in the bed rise co-currently with the upflowing solids-suspending gas while the feeding of the solids and their discharge takes place countercurrently to the upflowing gas.

This is a continuation-in-part of my patent application Serial No. 631,573, filed November 29, 1945, now Patent No. 2,503,788, of April 11, 1950. That patent discloses several ways of heating the bed of fluidized solids in a state of turbulent mobility, one of which consists of fuel injection pipes terminating within the bed. The present invention is directed to the construction, arrangement, and operation of directing heating by fuel injection into the bed of fluidized solids.

The reactor serves to effect chemical reactions between solids and gases in an enclosed furnace chamber in which the bed of fluidized solids is maintained at a pre-determined depth while the solids-fluidizing gas is passed upwardly through the bed to react with the solids at a required reaction temperature, so this invention is directed to the ways and means for controlling the temperature at which the fluidized bed of solids, and their fluidizing gas, are to be treated. The natural or obvious way to heat the bed is to combust fuel and oxygen-bearing gas in a combustion-space below the bed, often called the windbox, but experience has shown that if this is done, such excessive temperatures are attained in the windbox, that they are destructive of the adjacent parts of the reactor. Moreover, these excessive temperatures sometimes rise to as high as 3,000° F. So a major object of this invention has been to discover how to heat the bed and its gases in a manner whereby the temperature thereof can be controlled and particularly, to be depressed below flame-temperature but high enough to effect the desired heat-induced reactions. In other words, how such solids and their fluidizing gas can be heated by direct combustion and yet normal flame temperatures avoided whereby the desired reaction temperatures can be controllably maintained at less than flame temperature. Another object is to have the solid reaction product resulting from this treatment substantially uncontaminated by carbonaceous combustion products or residues, which normally are to be expected when using such sub-flame temperatures.

These objects are attained in a bed of solids maintained in fluidized condition by an oxygen-bearing gas uprising therethrough at sufficient velocity to which bed solids are continually fed and from which bed treated solids are continually removed while maintaining a fluid-level on the bed, provided, that the bed of solids is preliminarily heated to ignition temperature by an auxiliary source of heat located below or beneath the bed, such as by an auxiliary burner, and upon the solids attaining ignition temperature, injecting pumpable fuel directly into the bed above its bottom whereupon the preliminary heating is discontinued. And thereafter the sub-flame reaction temperature is controlled to be above combustion temperature but below flame temperature by controlling various factors as hereinafter described. The success of the invention is based on the discovery that in a fluidized bed of solids once heated to ignition temperature substantially flameless combustion of directly injected fuel can be controllably carried on at a temperature far less than the combustion of the same combustants in an atmosphere having substantially no suspended solids therein.

The best embodiment of the invention now known to me is shown in the accompanying drawings, but it is so shown for illustrative purposes only, and is not to be taken as limiting, for obviously the invention is capable of other embodiments, and of different constructional arrangement, so long as they fall within the scope of the appended claims.

Figure 2:
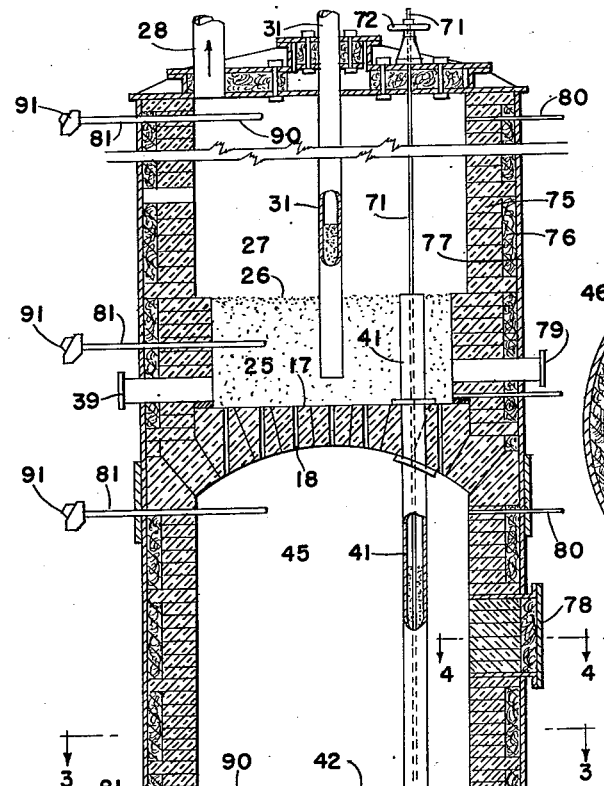
Figure 3:
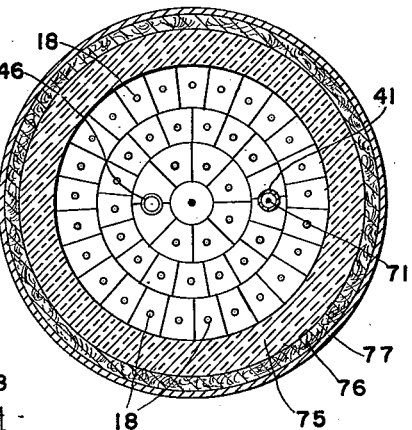
Figure 4:
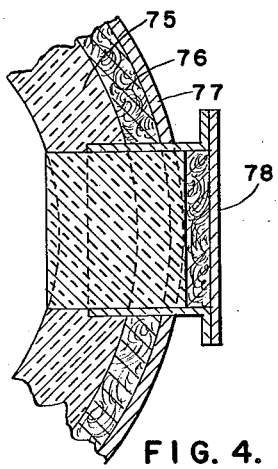
Figure 5:
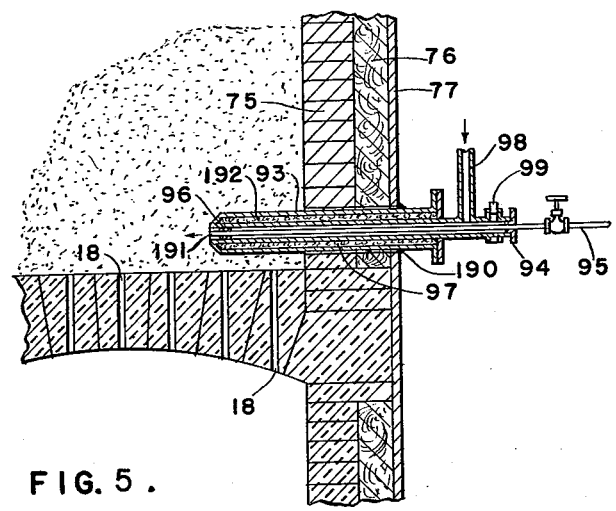
Figure 6:
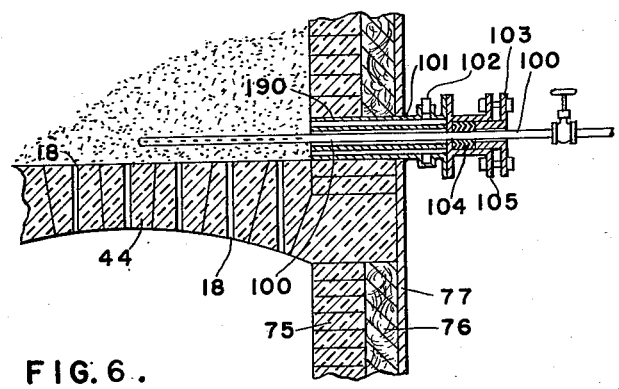
Figure 7:
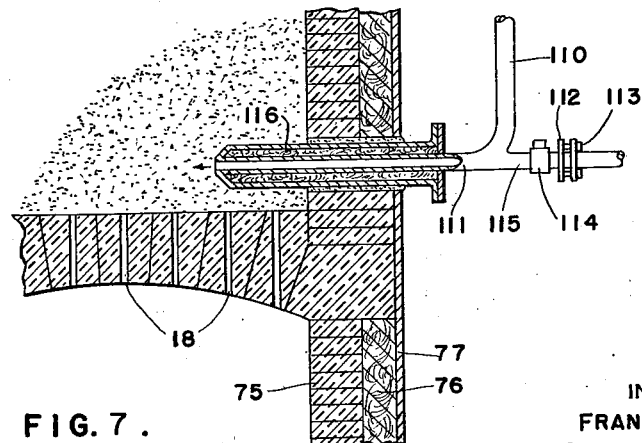

In the drawings, Fig. 1 is a vertical sectional view of my preferred reactor. Fig. 2 is an enlarged vertical sectional view of the reactor furnace shown with more particularity than in Fig. 1, but with less completeness. Fig. 3 is a plan view taken along the lines 3—3 of Fig. 2 while Fig. 4 is also a plan view but taken along the lines 4—4 of Fig. 2. Figs. 5, 6 and 7 are partial vertical sectional views of different types of fuel burners usable with this invention.

The reactor of this invention may take the form of a single compartment reactor including one apertured constriction plate with one fluidized bed thereon and one free-board space thereabove, it may take the form of a multi-compartmented reactor having a plurality of such compartments in superposed relationship.

In the drawings, 11 represents a suitably supported enclosed reactor furnace comprising a steel shell suitably insulated and lined with refractory bricks. It has a substantially cylindrical middle portion or section 12 in which heat treatment takes place, an upper or initial section 13 in which pre-heating takes place, normally smaller in diameter than the middle section 12, and a bottom section 14 where cooling takes place which is as small in diameter or smaller than the initial section 13. The bottom section 14 has a transition-tapered wall section 15 between it and the middle section 12, and there is a more or less similar transitionary tapered wall or section 16 between the middle section 12 and the upper or initial section 13.

In the upper section 13, adjacent its lower end or bottom, is a gas permeable initial constriction diaphragm platform or plate 17 extending substantially horizontally across the section 13 and provided with a multiplicity of perforations or apertures 18 upwardly through which gas may pass. The plate is made of heat-resistant metal or refractory material. Supported on and extending upwardly from the plate 17 is an initial ever-changing layer or bed of solids to be treated with gas. These solids are to be fluidized into a turbulent mobilized suspension by the gas passed upwardly therethrough at such velocities that the solids act like a fluid and present a fluid level 26, above which is free-board space 27. Rising from the top region of the initial or upper section 13 is a pipe or conduit 28 for conducting dust particles rising from the fluidized layer 25 to a cyclone 29. Gas escapes from the cyclone through its top as at 30, which solids separated from entrainment in the gas, drop down through pipe 31 to the layer 25 in a region adjacent the bottom of the layer and close to the constriction plate 17, since the lower end of the pipe 31 is preferably submerged in the fluidized layer, as shown.

Solids to be treated in the reactor are supplied thereto from a hopper 35 from whence they drop onto an endless conveyor 36 which can be of the weighing type. The belt delivers such solids into a screw conveyor 37 suitably driven by such as a motor 38. The conveyor screw operates in a conducting or delivery tube or pipe 39 that passes through the wall of the reactor and terminates in the layer or bed 25 in a region adjacent the bottom thereof as shown.

The fluid level 26 of the layer or bed 25 is controlled by the elevation of the upper end of a spill-pipe or conduit 41 which pipe extends downwardly through the bed 25 and plate 17 terminating submergedly in an ever-changing layer or bed 42 under treatment in the middle section 12 of the reactor. This bed or layer is fluidized like the initial bed 25 and has a fluid level 43 as well as a free-board space 45 thereabove. This bed is supported on or from a second or middle gas permeable constriction diaphragm, platform or plate 44 perforated or apertured as at 18, the same as the initial apertured plate 17.

The fluid level 43 of the second or heat-treatment bed or layer 42 is controlled by the elevation of the upper end of a spill-pipe or conduit 46 which pipe extends downwardly through the fluidized bed 42 and plate 44, terminating submergedly in an ever-changing cooling layer or bed 50 in the bottom section 14 of the reactor. This bed is fluidized like the beds 25 and 42 and has a fluid level 51 as well as a free-board space 52 thereabove. This bed or layer 50 is supported on or from a third or bottom constriction diaphragm plate or platform 53, perforated or apertured as at 18, the same as in plates 17 and 44.

The fluid level 51 of the bottom bed or layer 50 is controlled by a discharge conduit or spill-pipe 54 suitably valved as at 55 that conducts treated solids to a plate outside of the reactor. The bottom section 14 of the reactor terminates in a wind-box 58 having an entrance inlet 59 for compressed air or other gas, which the wind-box conducts to the underside of the constriction plate 53 so that air therefrom can pass upwardly through the apertures therein for the purpose of fluidizing or suspending or teetering the solids in the bed 50.

Into the tapered section 15 of the reactor, extends an auxiliary burner 61, while into the middle or heat-treatment bed 42 may extend suitably valved oil injection pipes 62 terminating in that bed adjacent the bottom thereof. Spill-pipe 41 is provided with a closure 70, preferably at its lower end and in the form of substantially that of a cone or coned plug, which is controlled to open and close it by means of a shaft 71 extending upwardly through the spill-pipe and the top or roof of the reactor to a control wheel 72. Spill-pipe 46 has its lower end controllably closed by a similar coned valve 73, operated from a downwardly extending shaft 74 and a control wheel 74'.

The closing of the substantially flat-bottomed coned valves 70 and 73 has another important function because when they are partially closed or adjustably positioned with respect of the outlet end of their respective spill-pipes, the flat bottom of the valves baffle gas uprising against it while the coned surfaces of the valve exert a certain deflective and dispersive effect on the solids being emitted from the spill-pipes into the fluidized bed. When the valve plugs or cones are wide open, there is a tendency of solids descending in the spill-pipes to be retarded and possibly to arch or clog, but if the coned valve plugs are opened to a certain degree, the descending solids hitting the coned surface of the valve plugs are deflected and dispersed to such an extent that there is minimization of retardation of solids descending through the spill-pipes. If opened too far, this effect is not realized.

Suitable temperature indicators, such as a thermocouple, are used in each free-board space 27, 45 and 52 respectively and in the bottom section of layers 25, 42 and 50 respectively while suitable pressure indicators are used in the free-board spaces and in the layers.

The space between one apertured plate and another, in this multi-compartment reactor, may be referred to as a compartment or chamber and each includes a fluidized bed and its free-board space immediately thereabove. The constriction plates 17, 44 and 59 are of suitable heat-resistant material, either of metal or of refractory ceramic.

The operation of the reactor is continuous. Assuming that it has been properly started-up and the various layers or beds are properly fluidized by the controlled velocity of gas passing upwardly therethrough, feed solids are supplied from the hopper 35 by the feed screw 37 through the feed pipe 39 into the bottom section of the initial or pre-heating layer 25. Solids in layer 25 are preliminarily heated by the hot gases from free-board space 45 uprising therethrough from the apertures 18 of the constriction plate 17. Dust from the bed entrained in gas rising therefrom passes through conduit 28 to the cyclone 29 wherein the dust particles are separated from the gas and descend through pipe 31 back to the layer 25 for re-treatment, while gas escapes from the cyclone at 30. Fluidized or teetered solids rising above the top of the spill-pipe or conduit 41 (fluid level 26), spill over the top thereof and fall down that pipe to the bottom section of the dissociation layer 42 for submerged delivery thereinto.

The main layer 42 where the major reactions are to take place, is maintained at the desired temperature and in fully fluidized or mobilized condition by gas uprising from free-board space 52 therethrough from the apertures 18 in constriction plate 44. Treated fluidized solids rising above the top of the spill-pipe or conduit 46 (fluid level 43), spill over the top thereof and fall down that pipe to the bottom section of the cooling layer 50 to the bottom section thereof for submerged delivery thereinto.

The cooling layer 50 is maintained at cooling temperatures and in fully fluidized condition by gas rising through apertures 18 in constriction plate 53 from the wind-box 58. Cooled solids pass from the fluid level 51 of the cooling layer 50 by spilling over and into the upper end of the discharging spill-pipe or conduit 54 to discharge. In this way, each layer or bed is not only maintained fluidized but made up of everchanging solids being treated with gas in such layers.

The main or middle layer 42 is maintained at proper temperature by being heated controllably thereto. Heating is accomplished either (or both) by the use of oil as fuel supplied, for instance, through the oil injection pipes 62 leading into that layer. For initial heating up of the reactor, an auxiliary gas burner 61 is provided, which is unused after the reactor and its burden get up to operating temperature.

When starting up, the cone valve 73 at the bottom of spill-pipe 46 is closed; coned valve 70 at the bottom of spill-pipe 41 is closed; and valve 55 in discharge pipe 54 is also closed. Compressed air or other relatively cool gas is admitted to the wind-box 58, which flows upwardly through constriction plate 53. The auxiliary burner 61 is started. At this time, the solid material to be treated in the reactor, if not already fine enough, is crushed to pass a 6 mesh screen, the bulk of which, however, is coarser than 200 mesh, is delivered to the initial or pre-heating layer 25 by means of the feeder elements 36, 37 and 39. The rising current of hot air will cause, when at a velocity of substantially from 0.50 to 4.0 feet per second, the crushed solids to be fluidized, imparting to the mass thereof a turbulent motion simulating a boiling liquid, and like a liquid it will assume a fluid level in the layer 25. Feed solids are supplied until the layer reaches a fluid level 26 whose elevation is controlled by the upper end of the spill-pipe or transfer conduit 41 and starts to drop or fall down that pipe, whereupon the coned valve 70 is opened to allow the spilling solids to fall onto the constriction plate 44. This operation is continued until the level of the solids in the main or middle layer 42 is sufficient to seal the lower end of the pipe 41. When the layer 42 has been about half formed, or formed to about half its normal height, the feed is stopped. The temperature of the solids in the layer 42 is made to rise by heat from the auxiliary burner 61. When the heat reaches a temperature sufficient that the regular fuel, either gaseous or liquid or solids, will ignite, the auxiliary burner is shut down. The main fuel system is then started, namely either the oil burners or the gas burners 62. The fuel will then combust in the layer with the air supplied, and the very large mass of hot solid particles present a large area to promote surface combustion. When the layer reaches an operating temperature, feeding is started again and cone valve 73 at the bottom of spill-pipe 46 is opened. Solids from layer 42 spill over into spill- or dip-pipe 46, which delivers them onto the constriction plate 53 whereupon a layer 50 builds up to an elevation or liquid level 51 whereupon solids flow down discharge pipe 54. The hot, treated solids submergedly delivered to the layer 50 are cooled in that layer by heat exchange with the current of air uprising therethrough to maintain combustion in the dissociation layer 42. Finished product is delivered through discharge pipe 54, the flow being regulated by valve 55.

Solids in the initial layer 25 are preliminarily heated by heat exchange with the current of heated gas uprising through that layer, comprising the products of combustion in the layer 46 plus any gas yielded as a result of heat treatment of solids in that layer.

It is to be noted that except for the auxiliary burner 61, there is no heating of the gas or air in the lowermost or cooling bed 50, or of its free-board space 52. Thus, in normal operation the sole direct application of heat to the main layer 42 is very important in order to get the maximum coling effect in the cooling layer or bed 50 to which no heat is applied.

The diameter of the cooling layer 50, and that of the initial preheating layer 25 should normally be less than that of the middle layer 42, as shown in the drawings. The reason is in order to maintain gas velocities through each layer all substantially uniform and so that they fall within the limits of from 0.5 to 4.0 feet per second. To attain such uniformity, there must be taken into consideration the fact that only relatively cool air from the wind-box 58 passes through the bottom or cooling layer 50, while that air when very hot plus the fuel passes through the heated middle layer 42, and through the initial or preheating layer 25 there passes gas made up of products of combustion that have been substantially reduced in temperature. In other words, the temperature of the gas as well as its pressure are important factors to consider when determining velocities attained. The middle layer may be from two to three times the temperature of the bottom or cooling layer, while those of the initial or preheating layer are somewhere in between, so these are different enough to have to be considered. The velocities mentioned are "space rates," that is, the velocity that the gas would have through space unoccupied by any solids. The freeboard spaces preclude excessive dust losses. The reactor may be round, square or other shape in cross-section.

In the multi-compartment reactor embodiment of this invention, the overflowed solids are generally conducted directly to the lower portion of a lower bed. This is important when the diameter of the fluidized bed is small compared to its depth because the path of travel of the solid particles from their point of entrance to their point of exit is thereby increased and short circuiting is decreased. When the diameter of the bed is great as compared to the depth, the point of entrance of the solids is generally located on the opposite side of the bed from their point of exit. In this case the distance between the points of entrance and exit cannot be greatly increased by extending the spill-pipe to the bottom of the fluid bed and nothing is gained thereby.

It might be mentioned that an overflow or spill-pipe generally starts to work normally when its lower opening is covered by the fluidized bed. Therefore extending an overflow or spill-pipe down close to the apertured constriction plate below permits normal operation to start when only a shallow fluidized bed is present in that chamber. This makes starting up operations easier for less solids need to be introduced by the special means previously mentioned.

A spill-pipe or conduit such as is proposed herein for use for feeding solids from one fluidized bed to a lower fluidized bed will not perform its function in a satisfactory manner unless the flow of gas up the spill-pipe is small in comparison with the total flow through the reactor. This is attained by paying proper regard to: (1) the overall length of the spill-pipe including the height of the free-board between beds or layers through which it passes; (2) the depth to which said pipe is submerged in the lower fluidized bed; (3) the depth of the two fluidized beds; and (4) the pressure drop across the constriction plate supporting the upper fluidized bed. As to point (1), attention is called to the showing in Figs. 1 and 2, wherein it will be seen that each of the spill-pipes 31, 41 and 46 contain solids rising to an elevation considerably above the fluid level of the bed that they feed. This is because it appears necessary that there be sufficient hydraulic head of solids in the spill-pipes in order to overbalance resistance offered to their being emitted from the lower end of the spill-pipes by the fluidizing pressures in the beds into which they are emitted. As a rather rough measure, the solids should rise in the spill-pipe to a height equal to about one and a half times the depth of the fluidized bed to which solids are supplied by the spill-pipe.

Further in the multi-compartment embodiment of this invention, cooling of the treated solids can take place in a compartment immediately subjacent the heat-treatment chamber because the fuel necessary for generating such heat is supplied directly into the bed of solids in the heat treatment chamber in such a manner that it does not substantially heat up the cooling chamber. Again, by the arrangement of superposed chambers as taught by this invention, the various chambers can be devised as to size and depth of bed they contain to offer effective heat utilization and balance as well as other economically desirable factors. For instance, the comparatively large amount of material in process in the main heat treatment layer 42 serves, through its large heat capacity, to stabilize the temperature therein, making the problem of adding feed, fuel, and air in the correct proportion to maintain the desired temperature, far simpler than in conventional processes. A further advantage is that this reactor furnace can be conveniently insulated, heat losses due to radiation being kept to the minimum, and the temperature in the main reaction chamber can be controlled to a nicety even though the working temperature is high.

The foregoing is more or less explanatory of the principles involved and the general method of operation so there will now be described details of construction. Fig. 2 shows in greater detail a reactor furnace embodying this invention. In the furnace 75 indicates walls of refractory bricks outside of which are sections of insulation 76 and a steel outer casing 77. 78 indicates a removable manhole to provide access to the interior of the furnace. 79 indicates various clean-out openings. 80 indicates various pressure taps, located usually at the top and bottom of each chamber. These taps indicate the pressure in that zone of the furnace where the taps are located and they are suitably connected to a manometer type indicator board that can be observed by the furnace operator. Similarly, 81 indicates various temperature indicators located generally in the top of a chamber and within the bed or layer of that chamber. These, likewise, are suitably connected to an indicator board that can be observed by the furnace operator. The constriction plates 17 and 44, in this embodiment, are made of refractory bricks instead of metal and the arrangement of the bricks is shown in plan view in Fig. 3 with the apertures therethrough. In order that the refractory brick constriction plates are strong enough to resist the temperature encountered without sagging or warping, it is desirable that the plate be arched as shown, and the bricks tapered from top to bottom, as indicated in Fig. 2.

The preferred construction of the wind-box 58 comprises a bottom plate 84 having an air inlet 59. Side wall 83, or side walls, close the space between the bottom 84 and the construction plate 53. This plate is formed of metal and is provided with a plurality of thicker sections or insets 85, each containing the gas permeable vertical aperture 18. 80 indicates a pressure tap in the bottom plate 84 of the wind-box 58.

The fuel to be injected directly into the bed of fluidized solids, can be either gaseous, fluid, or powdered or pulverized solids, is impelled directly onto the turbulent solids without requiring carburetion or any equivalent thereof. The normally expectable carbonization of the fuel on the solids does not take place, the only requirement being that the pipe through which the fuel is released into the mobilized solids in the reactor shall be cooled to prevent carbonization within that pipe. No particular kind of burner is requisite, merely an ordinary pipe with an open end, and enough of such fuel emitting pipes arranged radially around the lower section of the bed wherein combustion is to be effected and not too close to the constriction plate that supports the bed.

Basically, the operation of this phase of this invention is that the heat is developed by fluidizing a bed of finely divided solids contained in the reactant vessel, with an upward flowing stream of oxygen bearing gas, heating this bed by auxiliary means to a temperature somewhat above the lowest ignition temperature of the fuel to be used, whereupon the process fuel can be directly injected at a number of points into the bed. The fuel and oxygen combust rapidly and efficiently liberating the heat directly to the solids. Temperature of the bed can be closely controlled by admission of fresh feed as in the case of a calcining process, use of excess air, or oxygen gas where the hot combustion gases are desired for other uses, development of steam within heat transfer coils submerged in the bed and so on.

As specific examples of use of this method of combustion, the calcination of lime using gas fuel oil or pulverized coal will be described.

As to Fig. 1 and Fig. 2 each shows the general arrangement of a fluidizing reactor. While such a reactor can be used in many heat-treating operations, and the treatment of solids and gases while heated, by way of example, the operation of the reactor will be described for the burning of lime. The multi-kilns or retorts shown in each of these figures consist of a steel shell circular in plan—sometimes referred to as a cylindrical steel shell lined with insulation and refractory material previously described and divided into three chambers of perforated constriction plates 17, 44 and 53 whereby there is embodied for each kiln a cylindrical middle portion or reactor section 12 defined in the region between the upper constriction plate 17 and the intermediate constriction plate 44, an upper initial section 13 wherein pre-heating takes place, to wit, in the region above the constriction plate 17 and a lower or bottom section, to wit, below the constriction plate 44 but above the constriction plate 53, wherein there is provided a section whereat cooling takes place. The constriction plates 17, 44 and 53, each constitute or provide gas permeable diaphragm members or platforms on which there is respectively supported an upper bed 25 of fluidized material undergoing a preheating operation, a main bed or layer 42 wherein a heat-treating process is being carried out upon the material constituting said bed and a lower bed of already treated material undergoing a cooling operation, to wit, a bed which is maintained in fluidized condition by the upflowing gas passing thereinto through the apertures or multiple sets of perforations 18 thereof. In this connection it will be noted as heretofore pointed out that each of the apertured plates or platform members is provided with a multiplicity of such perforations providing upflow openings for the passage of gas or gaseous products flowing upwardly therethrough.

Figs. 5, 6 and 7 illustrate the general design of burners which may be inserted for supplying heat to the lower interior portion of the fluidized bed 42 overlying the constriction plate 44. For this purpose a ported opening, preferably a plurality of ported openings, is provided through the shell and lining wall of the heat-treating section 2. Such ported opening, or openings, is designated 90 and is provided whereby a burner of Figs. 5, 6 and 7, as the case may be, can be inserted and properly held in place for providing a burner or a series of burners, located in the lower portion of the bed and preferably spaced a short distance above the constriction plate or member 44.

The burner of Fig. 5 is adapted to supply liquid fuel into the bed. It consists of a heat-resisting alloy pipe 191 surrounded by insulation 192 and protected from erosion by the fluidized solids bed by an outer heavier alloy steel pipe 93. A central oil-admission pipe 95 is inserted along the centerline through the packing gland 94 provided at the outer end of pipe 191. The inner end section of the oil-admission pipe 95 is held on the center by the three or four spaced guides or lugs 96 within and near the inner end of the insulation pipe 191. Cooling air is admitted from the pipe 98 into and so as to flow through the annulus 97 between the exterior of the oil-admission inlet pipe 95 and the interior of the heat-resisting alloy pipe 191 and this cooling air further aids in protecting the oil-carrying inlet pipe 95 from heat and this in a manner for preventing carbonization of the fuel passing through and from the inlet pipe 95. The oil pipe 95 is arranged for withdrawal against pressure so that it can be cleaned without interrupting furnace operations. A plug valve or cock is provided at 99 to facilitate such withdrawal and it can be closed at a period when the oil inlet pipe 95 has been removed for inspection or replacement.

In connection with the foregoing, it will be noted that oil admitted through the several burners (just described) as liquid streams is conveyed rapidly to all parts of the violently agitated, fluidized bed of solids. Air or other oxygen-bearing gas fluidizing the bed combusts with the oil on the surface of the particles liberating its heat. Combustion is rapid and efficient. Due to the very large area of solid surface, the heat will transfer to the solids instantly with but very little temperature differential required. For example, with a bed made up of 20% $CaCO_3$ and 80% $CaO$, the temperature will not rise above 1600° F. which is 40° F. less than the theoretical dissociation temperature of $CaCO_3$ at a $CO_2$ pressure equal to atmosphere pressure.

Conditions such as spacing of burners; amount of projection into bed; depth of bed; temperature; and space rate (degree of agitation of bed); all have their influence on the combustion process and must be taken into consideration in the design of the furnace. The relative weight to be given each of these factors is not yet fully determined but they do not affect the basic principle of injecting a liquid, unatomized fuel into a bed of hot solids fluidized by air or other oxygen bearing gas for the purpose of securing combustion on the surface of the fluidized particles.

Fig. 6 shows a typical gas burner which can be used for the fluidizing reactor or apparatus. While the mechanism of surface combustion on the particles of the fluidized bed is substantially the same as with oil, it is necessary to distribute the gas more evenly throughout the bed to effect proper mixture of gas and air. This is accomplished by inserting the perforated gas supply pipe 100 along the top of the constriction plate 44 supporting the bed for a considerable portion of the radius of the furnace. By properly constricting the perforations, satisfactory and uniform distribution can be effected. The bed, if sufficiently deep, will assist in the lateral diffusion of the gas thus assuring complete combustion.

In the burner of Fig. 6 a casing member 101 is provided in the opening at 190 and it is equipped with a plug cock 102 whereby the gas inlet pipe 100 may be removed. With respect to the burner of Fig. 7 the gas inlet pipe 100 can be withdrawn by retracting the same sufficiently to clear plug cock 102 and by then closing said cock 102, after which one can pull the pipe past the stuffing or packing material 104 of gland 103 and completely free of the bonnet member 105 for cleaning or replacement of the pipe 100 as the case may be. The air or combustion supporting gas which is provided for igniting or combusting the gas supplied through the pipe 100 is supplied in this instance preferably through the apertured openings of the constriction plate 44. A plug cock 102 provided on the casing 101 can be closed to prevent the egress of gas or solids outwardly through the casing 101 at a time when the inlet pipe 100 is removed from plate.

Fig. 7 shows a typical pulverized fuel burner, which may be employed in a fluidizing apparatus or heat-treating reactor of the type in question. With respect to this burner the fuel is preferably supplied as solids in pulverulent form through an inflow pipe 110, to wit, as pulverized fuel in an air-carrying stream. For example, the pulverized fuel may be solids such as coal solids at minus 200 mesh and is conveyed by a number of burners by a portion of the air required for combustion. In this instance there is a burner construction following much after the lines of the burner of Fig. 5 except that the fuel-supply tube embodies a dip member or inflow pipe section 110 into and through which an air-conveyed stream of pulverized fuel is delivered into and through burner delivery tube 111. The particles of solid fuel are rapidly conveyed and admixed with the hot fluidized bed where they combust and radiate their heat to the surrounding lime or other solid particles undergoing treatment. Again very little temperature differential is required to effect the transfer due to the great amount of exposed areas involved. The burner pipe should be properly insulated at 116 to prevent early carbonization which tends to plug the burner. The burner is arranged for drilling out or unclogging while in service should such be necessary. To that end, a packing gland 112 having a removable element or cap 113 is provided and this is also provided with a plug cock 114 on an extension portion 115 of the pipe 111.

In connection with the calcining of lime in a reactor typified by the reactors of Figs. 1 and 2 and employing burner structure as described in connection with Figs. 5, 6 and 7, it will be noted that in general the burners should be inserted or installed so as to be in horizontal arrangement at elevations about 6" above the constriction plate with which they are associated; also that the pressure of air and fuel delivered therefrom will vary according to furnace.

In the calcining of lime in a reactor typified by the apparatus herein described, it will be noted that the basic stone or lime providing material, in relatively fine form, is delivered as through a screw impelling transfer pipe 37 whereby it is conveyed to the upper compartment wherein it is subjected to a preheating operation. Here it is fluidized by hot gases rising from the heat-treating or reaction chamber below and thus becomes initially preheated material; it progressively passes downwardly from the pre-heated chamber as through a down-flow pipe 41 and is delivered as initially preheated material into a lower portion of the bed 42 of fluidized material undergoing the heat-treating operation. In this heat-treating region the fluidized bed 42 has imparted thereto further heating, as for example, due to the burners above described in connection with Figs. 5, 6 and 7 where such burners are employed or through heat of hot gases passing from the burners 63 provided in the lowermost compartment. In each instance heat is applied directly, or relatively directly, to the hot particles in the lower portion of the bed and thus directly to the surface of the stone, causing it to be calcined to lime. The gases issuing from the top of the bed are substantially of the same temperature as the bed itself. Although theoretical flame temperatures of most fuels are above 3000° F., this temperature is never observed, the heat being absorbed by the reaction as fast as it is liberated.

Combustion is very efficient, as low as 3% excess air being maintained without production of unburned combustibles. By closely metering the air and fuel admitted to the furnace the combustion can be held within narrow limits. Temperature of the process can then be very closely held by throughput of new feed, which is delivered into the upper or preheated chamber.

As previously indicated the proceeding excess lime spills from within the intermediate or heat-reacting chamber into the spill-pipe 46 where it is conveyed to the lower compartment wherein it can be subjected to a cooling operation by the uprising stream of gas or air passing from the wind boxes below the bottom constriction plate 53 upwardly through the multiplicity of perforations or aperture openings 18 thereof. Thus the processed lime is cooled by the uprising cooler incoming stream of air from the wind box thus serving to complete an initial heating or warming up of the combustion air in a regenerative manner. The cool calcined lime products pass from the apparatus through the downflow spill-pipe or discharge conduit 54.

I claim:

1. The continuous process of reacting finely divided solids with gases at their reaction temperature, which comprises maintaining a bed of such solids in an enclosed chamber; fluidizing solids of the bed into a state of turbulent mobility whereby the solids thereof act like a fluid by passing a stream of oxygen-bearing gas uprisingly and dispersingly through the bed at solids-fluidizing velocity from a place beneath the bed; feeding solids to the bed; discharging treated solids from the bed; initially and independently supplying fuel to the gas stream while uprising at such velocity; preliminarily and temporarily burning such fuel in the gas stream long enough so that heat liberated by such combustion heats solids of the bed to fuel-ignition temperature; while such solids are so heated separately supplying pumped fuel directly onto the solids in the bed at an elevation above the bottom thereof and different from that of the preliminary independent burning; and terminating the supply of fuel to the place of the preliminary burning as well as its burning there; and thereafter while so directly provided with pumpable fuel maintaining combustion within the bed and the fluidizing gas therein at a temperature significantly less than the theoretical flame temperature of the corresponding fuel and gas if such were free to burn in a region devoid of loading solids undergoing heat treatment.

2. The process according to claim 1, wherein subflame temperature is regulated by controlling the rate of supply of at least one of (1) the solids fed to the bed; (2) the pumpable fuel, and (3) the oxygen content of the fluidizing gas.

FRANK S. WHITE.

REFERENCES CITED

The following references are of record in the file of this patent:

UNITED STATES PATENTS

| Number | Name | Date |
| --- | --- | --- |
| 1,196,705 | Kroll | Aug. 29, 1916 |
| 1,566,608 | Kruse | Dec. 22, 1925 |
| 2,367,281 | Johnson | Jan. 16, 1945 |
| 2,408,282 | Wolf | Sept. 24, 1946 |
| 2,409,707 | Roetheli | Oct. 22, 1946 |
| 2,433,726 | Angell | Dec. 30, 1947 |
| 2,444,990 | Hemminger | July 13, 1948 |

FOREIGN PATENTS

| Number | Country | Date |
| --- | --- | --- |
| 605,027 | Germany | Nov. 2, 1934 |